United States Patent [19]

Malone

[11] 4,244,593
[45] Jan. 13, 1981

[54] CONVERTIBLE SLED

[76] Inventor: Larry J. Malone, 619 W. Market St. Box 65, Baltimore, Ohio 43501

[21] Appl. No.: 962,010

[22] Filed: Nov. 20, 1978

[51] Int. Cl.³ .............................................. B62B 13/18
[52] U.S. Cl. ...................................... 280/8; 280/7.14; 280/14; 280/16; 280/17; 280/87.01
[58] Field of Search .................... 280/7.14, 7.12, 87.01, 280/16, 17, 14, 8

[56] References Cited

U.S. PATENT DOCUMENTS

| | | | |
|---|---|---|---|
| 1,124,973 | 1/1915 | Teichler | 280/16 |
| 1,350,929 | 8/1920 | McCarthy | 280/7.12 |
| 1,592,419 | 7/1926 | Campbell | 280/16 |
| 1,667,436 | 4/1928 | Rainey | 280/16 |
| 2,414,244 | 1/1947 | Roth | 280/16 X |
| 4,116,455 | 9/1978 | Dotson et al. | 280/7.14 |
| 4,134,599 | 1/1979 | DiMille et al. | 280/87.01 |

*Primary Examiner*—John J. Love
*Assistant Examiner*—Milton L. Smith

*Attorney, Agent, or Firm*—Daniel Jay Tick

[57] ABSTRACT

A front support member is pivotally affixed to the undersurface of a body-supporting board close to the front and equidistant from the sides thereof. A pair of rear support members are affixed to the undersurface of the board in spaced parallel relation close to the rear and equidistant from the sides thereof. Each of the support members comprises a block having a bore formed therethrough spaced from and parallel to the undersurface of the board. A front ski member and a pair of rear ski members have spaced ears with coaxial bores formed therethrough. The ears are spaced a distance from each other sufficient to accommodate the blocks of the support members therebetween with the bores of the block coaxial with the bores of the ears. Bolts pass through the bearings in the bores of the ears and the bores of the blocks to removably affix the ski members to the support members in a manner whereby the ski members are rotatable in planes perpendicular to the undersurface of the board.

5 Claims, 9 Drawing Figures

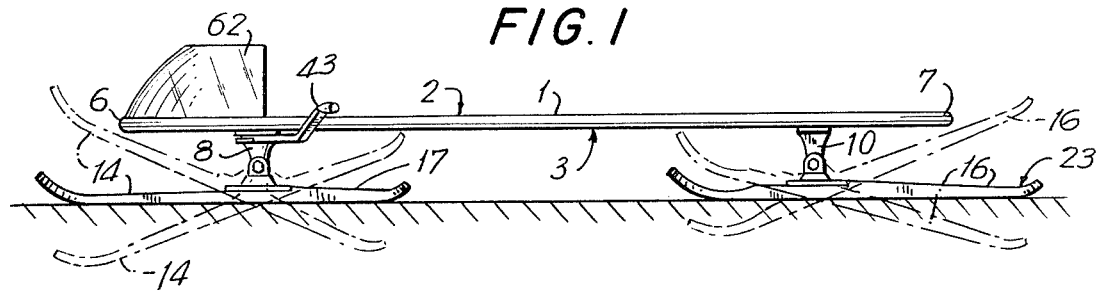
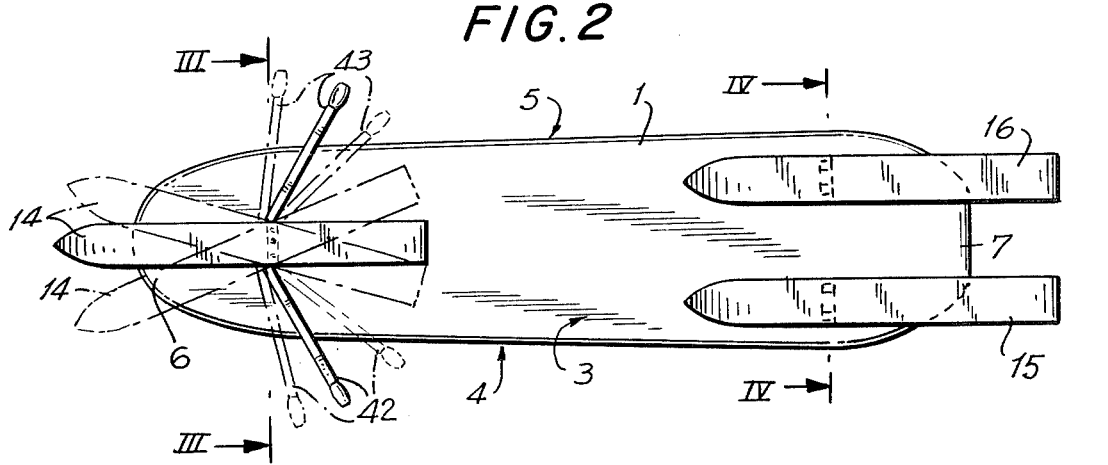
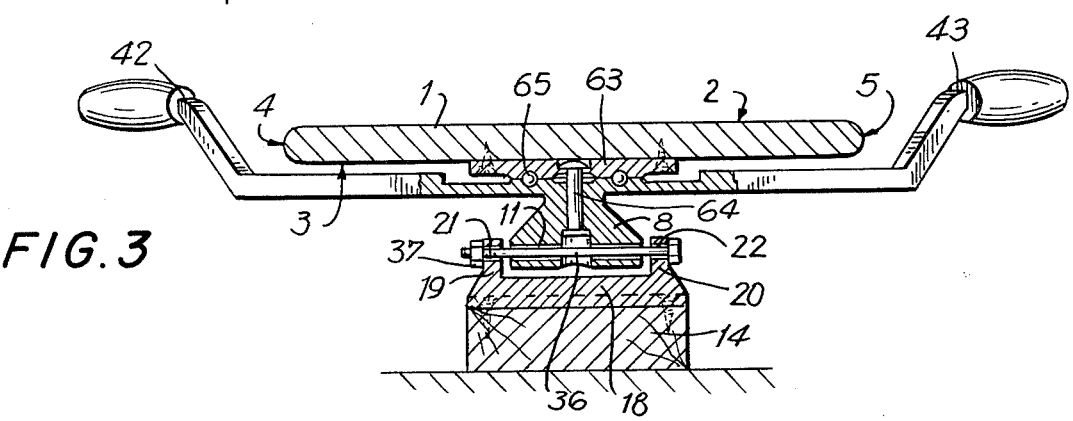
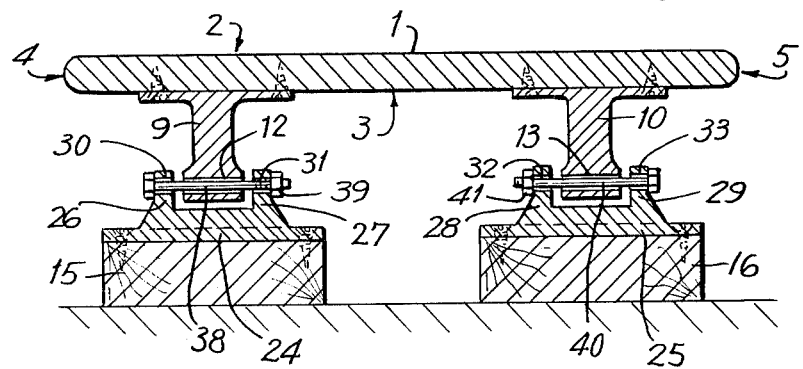

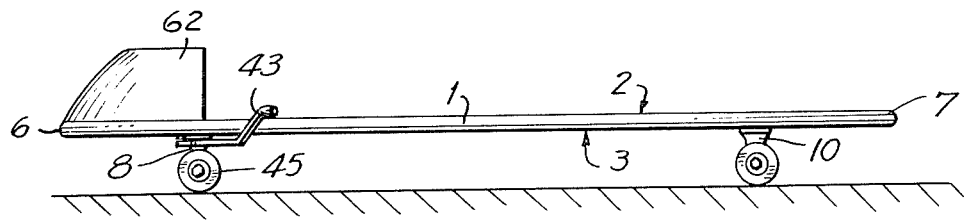
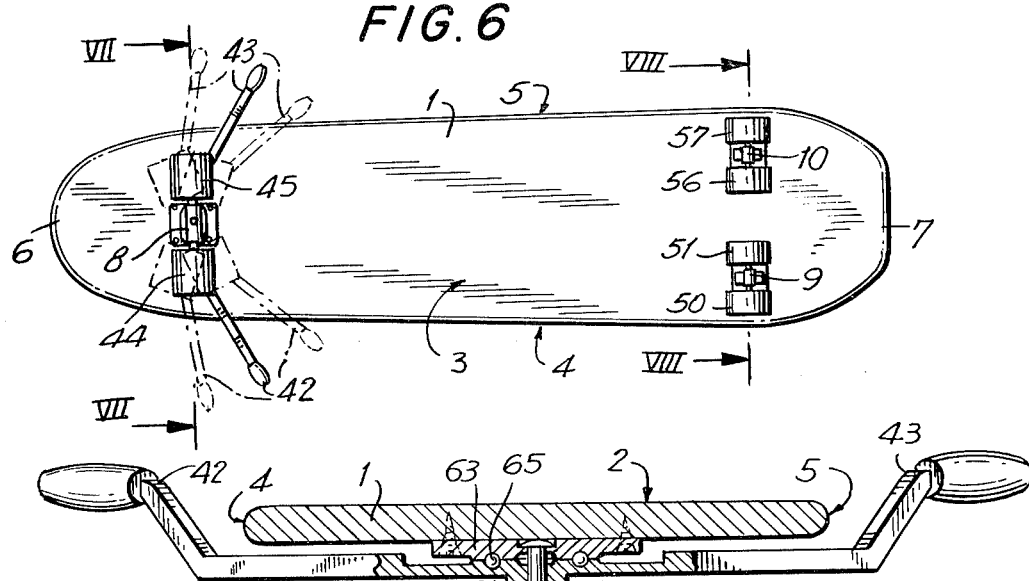
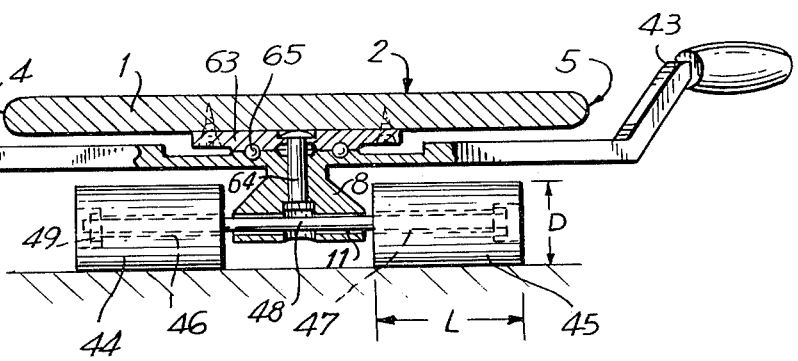
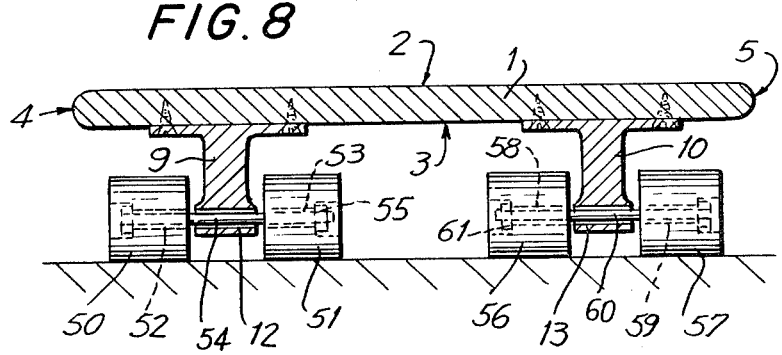
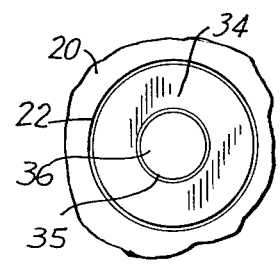

CONVERTIBLE SLED

BACKGROUND OF THE INVENTION

The present invention relates to a convertible sled. More particularly, the invention relates to a convertible sled for use on surfaces with high coefficients of friction as well as surfaces with low coefficients of friction.

The principal object of the invention is to provide a convertible sled for use on surfaces with high coefficients of friction such as, for example, land, grass, roads, streets, and the like, as well as surfaces with low coefficients of friction such as, for example, snow, ice, and the like.

An object of the invention is to provide a convertible sled of simple structure, which is inexpensive in manufacture and which is convertible with facility, convenience and rapidity from a land vehicle to a snow and ice vehicle, and vica versa.

Another object of the invention is to provide a convertible sled of simple structure which removably supports ski members for operation as a snow, ice, and the like, vehicle or sled.

Still another object of the invention is to provide a convertible sled of simple structure which removably supports wheels for operation as a land vehicle.

BRIEF SUMMARY OF THE INVENTION

In accordance with the invention, a convertible sled for use on surfaces with high coefficients of friction as well as surfaces with low coefficients of friction comprises a body-supporting board having an oversurface for supporting the body of a user and an undersurface. The board has sides, a front, and a spaced opposite rear. A front support member is pivotally affixed to the undersurface of the board close to the front and equidistant from the sides thereof. A pair of rear support members are affixed to the undersurface of the board close to the rear and equidistant from the sides thereof. The rear support members are in spaced parallel relation. Each of the front and rear support members comprises a block having a bore formed therethrough spaced from and parallel to the undersurface of the board and extending perpendicularly to the sides of the board in the rear support members. A front ski member is provided. A pair of rear ski members are provided. Each of the ski members has an oversurface and a coupling member extending therefrom with a pair of spaced ears having coaxial bores formed therethrough and spaced a distance from each other sufficient to accommodate the blocks of the support members therebetween. The bores of the blocks are coaxial with the bores of the ears. Annular bearing members are provided in the bores of the ears. Bolts pass through the bearing members of the ears and the bores of the blocks to removably affix the ski members to the support members in a manner whereby the ski members are rotatable in planes perpendicular to the undersurface of the board.

A pair of handle bars extend from opposite sides of the block of the front support member in substantially parallel spaced relation to the undersurface of the board to points beyond the sides of the board to enable a user to grasp the handle bars to selectively rotate the front support member in a plane parallel to the undersurface.

Each of a plurality of wheels has an axial bore formed therethrough. A plurality of annular bearing members are provided in the bores of the wheels. Bolts pass through the bearing members of the wheels and the bores of the blocks to removably affix the wheels to the support members in a manner whereby the wheels are rotatable in planes perpendicular to the undersurface of the board.

A windshield extends from the oversurface of the board at the front thereof.

Each of the wheels has a predetermined diameter and an axial length longer than the predetermined diameter.

BRIEF DESCRIPTION OF THE DRAWINGS

In order that the invention may be readily carried into effect, it will now be described with reference to the accompanying drawings, wherein:

FIG. 1 is a side view of an embodiment of the convertible sled of the invention equipped with ski members;

FIG. 2 is a bottom view of the embodiment of FIG. 1, equipped with ski members;

FIG. 3 is a cross-sectional view, on an enlarged scale, taken along the lines III—III, of FIG. 2; FIG. 4 is a cross-sectional view, on an enlarged scale, taken along the lines IV—IV, of FIG. 2;

FIG. 5 is a side view of the embodiment of FIG. 1, equipped with wheels;

FIG. 6 is a bottom view of the embodiment of FIG. 5, equipped with wheels;

FIG. 7 is a cross-sectional view, on an enlarged scale, taken along the lines VII—VII, of FIG. 6;

FIG. 8 is a cross-sectional view, on an enlarged scale, taken along the lines VIII—VIII, of FIG. 6; and FIG. 9 is a view, on an enlarged scale, of part of an ear of a coupling member of a ski member of the convertible sled of the invention.

DETAILED DESCRIPTION OF THE INVENTION

The convertible sled of the invention is used on surfaces with high coefficients of friction such as, for example, land, grass, roads, streets, and the like, when equipped with wheels, as shown in FIGS. 5 to 8. The convertible sled of the invention is used on surfaces with low coefficients of friction such as, for example, snow, ice, and the like, when equipped with ski members, as shown in FIGS. 1 to 4.

The convertible sled of the invention comprises a bodysupporting board 1 (FIGS. 1 to 8) having an oversurface 2 (FIGS. 1, 3 to 5, 7 and 8) for supporting the body of a user and an undersurface 3 (FIGS. 1, 2, 4 to 6 and 8). The body-supporting board 1 also has sides 4 and 5 (FIGS. 2 to 4 and 6 to 8), a front 6 (FIGS. 1, 2, 5 and 6) and a spaced opposite rear 7 (FIGS. 1, 2, 5 and 6).

A front support member 8 is pivotally affixed to the undersurface 3 of the board 1 close to the front 6 and equidistant from the sides 4 and 5 thereof, as shown in FIGS. 1, 3, 5 to 7. A pair of rear support members 9 and 10 are affixed to the undersurface 3 of the board 1 close to the rear 7 and equidistant from the sides 4 and 5 thereof, as shown in FIGS. 4, 6 and 8. The rear support members 9 and 10 are in spaced parallel relation, as shown in FIGS. 4, 6 and 8.

Each of the front and rear support members 8, 9 and 10 comprises a block having a bore formed therethrough, spaced from, and parallel to, the undersurface 3 of the board 1 and extending perpendicularly to the sides 4 and 5 of the board in the rear support members 9 and 10. Thus, as shown in FIGS. 3 and 7, the front support member has a bore 11 formed therethrough spaced from, and parallel to, the undersurface 3 of the board 1 and the rear blocks 9 and 10 have bores 12 and 13, respectively, formed therethrough, spaced from, and parallel to, the undersurface 3 of the board 1, as shown in FIGS. 4 and 8. The bores 12 and 13 extend colinearly and perpendicularly to the sides 4 and 5 of the board 1.

A front ski member 14 (FIGS. 1 to 3) and a pair of rear ski members 15 and 16, respectively (FIGS. 2 and 4) are provided. Each of the ski members 14, 15 and 16 has an oversurface and a coupling member extending from said oversurface with a pair of spaced ears having coaxial bores formed therethrough. The ears are spaced a distance from each other sufficient to accomodate the blocks of the support members between them with the bores of the blocks being coaxial with the bores of the ears.

Thus, the front ski member 14 has an oversurface 17 (FIG. 1) and, as shown in FIG. 3, a coupling member 18 extending from said oversurface. The coupling member 18 has a pair of spaced ears 19 and 20 having coaxial bores 21 and 22, respectively, formed therethrough, as shown in FIG. 3. The ears 19 and 20 are spaced a distance from each other sufficient to accommodate the front support member block 8 therebetween, as shown in FIG. 3, with the bore 11 of said block being coaxial with the bores 21 and 22 of said ears.

The ski members 15 and 16 have oversurfaces of which the oversurface 23 of the ski member 16 is shown in FIG. 1, and, as shown in FIG. 4, coupling members 24 and 25 extending from said oversurfaces. The coupling members 24 and 25 have pairs of spaced ears 26 and 27, and 28 and 29, respectively. The ears 26 and 27 of the coupling member 24 have coaxial bores 30 and 31, respectively, formed therethrough and the ears 28 and 29 of the coupling member 25 have coaxial bores 32 and 33, respectively, formed therethrough, as shown in FIG. 4. The ears 26 and 27 are spaced a distance from each other sufficient to accommodate the rear support member block 9 therebetween and the ears 28 and 29 are spaced a distance from each other sufficient to accommodate the rear support member block 10 therebetween, as shown in FIG. 4, with the bore 12 of the block 9 being coaxial with the bores 30 and 31 and the bore 13 of the block 10 being coaxial with the bores 32 and 33.

Annular bearing members are provided in the bores 21, 22, 30, 31, 32 and 33 of the ears 19, 20, 26, 27, 28 and 29, respectively. As shown in FIG. 9, which is illustrative of the ear 20, since all the ears 19, 20, 26, 27, 28 and 29 are identical, an annular bearing member 34 is coaxially mounted in the bore 22, and has an axial bore 35 formed therethrough for accommodating a bolt 36, as hereinafter described.

Bolts pass through the bearing members of the ears and the bores of the blocks to removably affix the ski members 14, 15 and 16 to the support members in a manner whereby said ski members are rotatable in planes perpendicular to the undersurface 3 of the board 1, as shown in FIG. 1. Thus, as shown in FIG. 3, the bolt 36 passes through the bearing members of the ears 19 and 20 and the bore 11 of the front support member block 8 to removably affix the front ski member 14 to said front support member in a manner whereby said ski member is rotatable in planes perpendicular to the undersurface 3 of the board 1. The bolt is secured by a nut 37.

As shown in FIG. 4, a bolt 38 passes through the bearing members of the ears 26 and 27 and the bore of the rear support block 9 to removably affix the ski member 15 to said support ski member in a manner whereby said ski member is rotatable in planes perpendicular to the undersurface 3 of the board 1. The bolt 38 is secured via a nut 39. A bolt 40 passes through the bearing members of the ears 28 and 29 and the bore 13 of the rear support member block 10, as shown in FIG. 4, to removably affix the ski member 16 to said support member in a manner whereby said ski member is rotatable in planes perpendicular to the undersurface 3 of the board 1. The bolt 40 is secured by a nut 41.

A pair of handlebars 42 and 43 extend from opposite sides of the front support member block 8, as shown in FIGS. 2, 3, 6 and 7, in substantially parallel spaced relation with the undersurface 3 of the board 1. The handlebars 42 and 43 extend to points beyond the sides 4 and 5 of the board 1 to enable a user to grasp said handlebars to selectively rotate the front support member 8 in a plane parallel to the undersurface 3 of the board 1, as illustrated in FIGS. 2 and 6, thereby permitting the user to steer the sled, as desired.

As shown in FIGS. 5 to 8, a plurality of wheels are provided. Each of the wheels has an axial bore formed therethrough and an annular bearing member in the bore of the wheel. Bolts pass through the bearing members of the wheels and the bores of the blocks to removably affix the wheels to the support members in a manner whereby said wheels are rotatable in planes perpendicular to the undersurface 3 of the board 1.

Thus, as shown in FIGS. 6 and 7, a pair of wheels 44 and 45 have axial bores 46 and 47, respectively, formed therethrough, as shown in FIG. 7. Annular bearing members are mounted in the bores 46 and 47 of the wheels 44 and 45, in the usual manner of roller skate and skate board wheels, and are not shown in the FIGS. A bolt 48 (FIG. 7) passes through the bearing members of the wheels 44 and 45 and the bore 11 of the front support member block 8 to removably affix said wheels to said support member in a manner whereby said wheels are rotatable in planes perpendicular to the undersurface 3 of the board 1. The bolt 48 is secured by a nut 49.

A pair of wheels 50 and 51 have axial bores 52 and 53, respectively, formed therethrough, as shown in FIG. 8. Annular members are mounted in the bores 52 and 53 of the wheels 50 and 51 in the usual manner of roller skate and skate board wheels. A bolt 54 passes through the bearing members of the wheels 50 and 51 and the bore 12 of the rear support member block 9 in a manner whereby said wheels are rotatable in planes perpendicular to the undersurface 3 of the board 1, as shown in FIG. 8. The bolt 54 is secured via a nut 55. A pair of wheels 56 and 57 have axial bores 58 and 59, respectively, formed therethrough, as shown in FIG. 8. Annular bearing members are mounted in the bores 58 and 59 of the wheels 56 and 57 in the usual manner of roller skate or skate board wheels. A bolt 60 passes through the bearing members of the wheels 56 and 57 and the bore 13 of the rear support member block 10 to removably affix said wheels to said support member in a manner whereby said wheels are rotatable in planes perpendicular to the undersurface 3 of the board 1, as shown in FIG. 8. The bolt 60 is secured via a nut 61.

A windshield 62 extends from the oversurface 2 of the board 1 at the front 6 thereof, as shown in FIGS. 1 and 5.

The pivotal coupling of the front support member 8 to the undersurface 3 of the board 1 is shown in detail in FIGS. 3 and 7. The front support member 8 is thus pivotally coupled to a plate 63 affixed to the undersurface 3 of the board 1, via a pivot pin 64. A bearing 65 is interposed between the adjacent surfaces of the front support member 8 and the plate 63 to provide smooth rotation of said front support member about the pivot pin 64.

In a preferred embodiment of the invention, each of the wheels 44, 45, 50, 51, 56 and 57, has a predetermined diameter D (FIG. 7) and an axial length L (FIG. 7) longer than said diameter.

While the invention has been described by means of a specific example and in a specific embodiment, I do not wish to be limited thereto, for obvious modifications will occur to those skilled in the art without departing from the spirit and scope of the invention.

I claim:

1. A convertible sled for use on surfaces with high coefficients of friction as well as surfaces with low coefficients of friction, said sled comprising
   a body-supporting board having an oversurface for supporting the body of a user and an undersurface, said board having sides, a front, and a spaced opposite rear;
   a plate affixed to the undersurface of the board close to the front and equidistant from the sides thereof;
   a front support member;
   a pivot pin pivotally coupling the front support member to the plate;
   a bearing interposed between the adjacent surfaces of said front support member and said plate to provide smooth rotation of said front support member about the pivot pin;
   a pair of rear support members affixed to the undersurface of the board close to the rear and equidistant from the sides thereof, the rear support members being in spaced parallel relation, each of the front and rear support members comprising a block having a bore formed therethrough spaced from and parallel to the undersurface of the board and extending perpendicularly to the sides of said board in said rear support members;
   a front ski member;
   a pair of rear ski members, each of the ski members having an oversurface and a coupling member extending therefrom with a pair of spaced ears having coaxial bores formed therethrough and spaced a distance from each other sufficient to accommodate the blocks of said support members therebetween, the bores of the blocks being coaxial with the bores of the ears;
   annular bearing members in the bores of said ears; and
   bolts passing through the bearing members of the ears and the bores of said blocks to removably affix said ski members to said support members in a manner whereby said ski members are rotatable in planes perpendicular to the undersurface of said board.

2. A convertible sled as claimed in claim 1, further comprising a pair of handlebars extending from opposite sides of the block of the front support member in substantially parallel spaced relation with the undersurface of said board to points beyond the sides of said board to enable a user to grasp said handlebars to selectively rotate said front support member in a plane parallel to said undersurface.

3. A convertible sled as claimed in claim 1, further comprising a windshield extending from the oversurface of said board at the front thereof.

4. A convertible sled for use on surfaces with high coefficients of friction as well as surfaces with low coefficients of friction, said sled comprising
   a body-supporting board having an oversurface for supporting the body of a user and an undersurface, said board having sides, a front, and a spaced opposite rear;
   a plate affixed to the undersurface of the board close to the front and equidistant from the sides thereof;
   a front support member;
   a pivot pin pivotally coupling the front support member to the plate;
   a bearing interposed between the adjacent surfaces of said front support member and said plate to provide smooth rotation of said front support member about the pivot pin;
   a pair of rear support members affixed to the undersurface of the board close to the rear and equidistant from the sides thereof, the rear support members being in spaced parallel relation, each of the front and rear support members comprising a block having a bore formed therethrough spaced from and parallel to the undersurface of the board and extending perpendicularly to the sides of said board in said rear support members;
   a plurality of wheels each having an axial bore formed therethrough;
   a plurality of annular bearing members in the bores of said wheels; and
   bolts passing through the bearing members of the wheels and the bores of said blocks to removably affix said wheels to said support members in a manner whereby said wheels are rotatable in planes perpendicular to the undersurface of said board.

5. A convertible sled as claimed in claim 4, wherein each of said wheels has a predetermined diameter and an axial length longer than said predetermined diameter.

* * * * *